United States Patent
Takahashi et al.

[11] Patent Number: 5,169,901
[45] Date of Patent: Dec. 8, 1992

[54] METHOD FOR HYDROGENATING CONJUGATED DIENE POLYMER

[75] Inventors: Kazuhiro Takahashi; Yoichiro Kubo, both of Yokohama, Japan

[73] Assignee: Nippon Zeon Co., Ltd., Tokyo, Japan

[21] Appl. No.: 806,280

[22] Filed: Dec. 13, 1991

Related U.S. Application Data

[62] Division of Ser. No. 676,373, Mar. 28, 1991, Pat. No. 5,128,297.

[30] Foreign Application Priority Data

Mar. 30, 1990 [JP] Japan ................... 2-80642

[51] Int. Cl.$^5$ .............................................. C08F 8/04
[52] U.S. Cl. ................................... 525/192; 525/338; 525/339; 502/159
[58] Field of Search ............. 525/338, 339, 192

[56] References Cited

U.S. PATENT DOCUMENTS 4,419,490 12/1983 Bayer et al. ................... 525/61
4,510,293 4/1985 Kubo et al. .................. 525/339

Primary Examiner—Patrick P. Garvin
Assistant Examiner—Brent M. Peebles
Attorney, Agent, or Firm—Sherman and Shalloway

[57] ABSTRACT

A catalyst comprising a high-molecular complex formed from a palladium compound and a nitrile group-containing polymer, and a method for hydrogenating a conjugated diene polymer which comprises selectively hydrogenating only a carbon-carbon double bond of the conjugated diene polymer using same.

2 Claims, No Drawings

METHOD FOR HYDROGENATING CONJUGATED DIENE POLYMER

This is a division of application Ser. No. 07/676,373, filed Mar. 28, 1991, now U.S. Pat. No. 5,128,297.

This invention relates to a catalyst comprising a high-molecular complex formed from a palladium compound and a nitrile group-containing polymer, and a method for hydrogenating a conjugated diene polymer using same. More specifically, this invention relates to a high-molecular complex having a specific structure wherein a nitrile group-containing polymer is coordinated with palladium and a method for hydrogenating a conjugated diene polymer using said complex as a catalyst.

Various methods have been hitherto proposed as a method in which a highly saturated polymer is obtained by selectively hydrogenating only a carbon-carbon double bond of a conjugated diene polymer at a high hydrogenation ratio (e.g. Japanese Laid-open Patent Application Nos 117501/1984, 17103/1983, 42937/1987, 125858/1987, 1814304/1987, 247706/1986, 45402/1989, 45403/1989, 45404/1989 and 45405/1989).

In general, when using a catalyst comprising a porous carrier and having supported thereon a metal having hydrogenation activity, such as cobalt, nickel, ruthenium, rhodium, platinum or palladium, a smaller particle size of the carrier provides higher activity. However, the smaller the particle size the more difficult to separate the catalyst after the reaction. Moreover, since viscosity of a polymer solution is high, reaction efficiency is poor, and a relatively large amount of the catalyst is required to achieve a high hydrogenation ratio.

Meanwhile, a method using a complex of nickel, titanium, etc. as a hydrogenation catalyst free from a carrier has been proposed (e.g. Japanese Patent Publication No. 17130/1971 and Japanese Laid-open Patent Application Nos. 220147/1985 and 33132/1986). The complex catalysts composed of these low-molecular compounds suffer defects that they are unstable to air, water, impurities in a polymer, etc. and decomposed by a solvent. Accordingly, pretreatments such as selection of a solvent, purification of a polymer, removal of a moisture from a polymer solution, etc. have to be thoroughly carried out. Therefore, these catalysts have merits when the polymer in solution as such resulting from solution polymerization is successively used in the hydrogenation reaction, but they are not suitable when a polymer containing polymerization by-products, like a polymer obtained by emulsion polymerization, is hydrogenated in solution.

Moreover, when a conjugated diene polymer is hydrogenated in a uniform system using a complex catalyst of rhodium, ruthenium, etc., the complex is unstable in a polar solvent that can dissolve the polymer, so that excess ligand has to be added. Consequently, after the reaction, it is quite hard to separate the resulting hydrogenated product from the catalyst and the excess ligand.

Palladium chloride has been so far used as a palladium salt which is soluble or partially soluble in a solvent, and a hydrogenation reaction of a low-molecular compound using palladium chloride is known (e.g. U. S. Pat. No. 1,023,753). However, said palladium chloride has almost no activity as a hydrogenation catalyst to a high-molecular compound. Further, a method in which a hydrogenation reaction is performed using a palladium salt of a carboxylic acid has been proposed (Japanese Laid-open Patent Application No. 117501/1984). However, this method has a defect that a step of reduction with hydrazine must be employed to increase hydrogenation activity.

Accordingly, it is an object of this invention to provide a hydrogenation catalyst which is soluble in a polar solvent, stable in the solvent and good in selectivity in a hydrogenation reaction.

The present inventors have made extensive studies and consequently found that a catalyst comprising a high-molecular complex formed from a palladium compound and a nitrile group-containing copolymer can achieve the aforesaid object.

Thus, according to this invention, there is provided a catalyst for hydrogenation of a conjugated diene polymer, comprising a high-molecular complex formed from a palladium compound and a nitrile group-containing polymer, and a method for hydrogenating a conjugated diene polymer using said catalyst.

One of the elements constituting the high-molecular complex in this invention is a nitrile group-containing polymer. Examples thereof include acrylonitrile, methacrylonitrile, allyl cyanide and vinylidene cyanide. Examples of another monomer constituting said polymer include conjugated dienes such as 1,3-butadiene, isoprene and 1,3-pentadiene; vinyl aromatic hydrocarbons such as styrene, alkylstyrene and divinylbenzene; unsaturated carboxylic acids and their esters such as acrylic acid, methacrylic acid, itaconic acid, maleic acid, methyl acrylate, butyl acrylate, 2-ethylhexyl acrylate, trifluoroethyl acrylate and methyl methacrylate; vinylpyridines; and vinyl esters such as vinyl acetate.

When the nitrile group-containing polymer is a copolymer, it may take a form of a random copolymer, a graft copolymer or a block copolymer, and may be produced by bulk polymerization, solution polymerization or emulsion polymerization.

Concrete examples of the nitrile group-containing polymer include polyacrylonitrile, a butadiene-acrylonitrile copolymer (NBR), a butadiene-methacrylonitrile copolymer, an isoprene-acrylonitrile copolymer, an acrylonitrile-butadiene-styrene copolymer, a butadiene-butyl acrylate-acrylonitrile three-component copolymer and a butadiene-n-butyl itaconate-acrylonitrile three-component copolymer.

Another element constituting the high-molecular complex in this invention is a palladium compound. The palladium compound is not particularly limited if it is palladium [II] and [IV] compounds. It may take a form of a salt, a complex salt or a complex. It may take a form of a salt, a complex salt or a complex. Concrete examples of the palladium compound include palladium chloride, palladium fluoride, palladium hydroxide, palladium nitrate, palladium sulfate, palladium oxide, dichlorocyclooctadienepalladium, dichloronorbornadiene-palladium, tetrakisacetonitrilepalladium tetrafluoroborate, tetrakisbenzonitrilepalladium ditetrafluoroborate, dichlorobisacetonitrilepalladium, dichlorobisethylene-diaminepalladium, bisacetylacetonatopalladium, tristriphehylphosphineacetonitrilepalladium tetrafluoroborate, dichlorobistriethylphosphinepalladium, dichlorobis-(dimethyl sulfide)palladium, dibenzoylsulfidepalladium, bis(2,2'-dipyridine)palladium perchlorate, and tetrakis-(pyridine)palladium dichloride.

These palladium compounds can be obtained as commercial products or produced according to "Shin Jikken Kagaku Kohza (New Experimental Chemistry Course)", No. 8, vol. 12 (published 1976 by Maruzen) or "Chemistry and Application of Noble Metals" (published 1984 by Kodansha Scientific).

The high-molecular complex catalyst is produced from the nitrile group-containing polymer and the palladium compound in the following manner. First of all, the nitrile group-containing polymer and the palladium compound are reacted under nitrogen atmosphere at 40° C. or lower for at least 5 hours in a solvent that dissolves the nitrile group-containing polymer and also dissolves or partially dissolves the palladium compound. When the reaction temperature is high, the nitrile group-containing polymer gels or the resulting high-molecular complex does not exhibit catalytic activity. Formation of the high-molecular complex catalyst can be confirmed by measuring spectrum. For example, in case of the nitrile group-containing polymer having the conjugated diene monomer units, when adsorption spectrum is measured using a dichloromethane solution of the resulting high-molecular complex, wide absorptions appear near 265 to 275 nm (UV zone) and 360 nm (visible zone). The amount of the palladium complex used as a catalyst may properly be determined according to an intended hydrogenation ratio. It is usually 2,000 ppm or less, preferably 1,500 ppm or less based on the polymer.

The conjugated diene polymer to be subjected to the hydrogenation reaction in this invention comprises 10 to 100% by weight of the conjugated diene monomer and 0 to 90% by weight of the monomer copolymerizable therewith. Examples of the conjugated diene monomer include 1,3-butadiene, isoprene, 2,3-dimethylbutadiene, 1,3-pentadiene, chloroprene and piperylene.

Examples of the copolymerizable monomer include unsaturated nitriles such as acrylonitrile, methacrylonitrile and vinylidene cyanide; vinyl aromatic hydrocarbons such as styrene, alkylstyrene and divinylbenzene; unsaturated carboxylic acids and their esters such as acrylic acid, methacrylic acid, itaconic acid, crotonic acid, methyl acrylate, butyl acrylate, 2-ethylhexyl acrylate, trifluoroethyl acrylate and methyl methacrylate; vinylpyridines; and vinyl esters such as vinyl acetate.

Typical examples of the conjugated diene polymer include polybutadiene, polyisoprene, a butadiene-styrene (randam or block) copolymer, a butadiene-acrylonitrile copolymer, a butadiene-methacrylonitrile copolymer, an isoprene-acrylonitrile copolymer, an acrylonitrile-butadiene-styrene copolymer, a butadiene-butyl acrylate-acrylonitrile three-component copolymer, and a butadiene-n-butyl itaconate-acrylonitrile three-component copolymer.

The hydrogenation reaction is performed, when using a polymer produced by solution polymerization, in solution state as such or, when using a solid copolymer, in such state that the copolymer is dissolved in a solvent. The concentration of the polymer solution is 1 to 70% by weight, preferably 1 to 40% by weight.

The solvent is preferably one which dissolves both the catalyst and the polymer, but is not necessarily one which can completely dissolve the catalyst. The solvent is selected depending on the type of the catalyst and the type of the polymer. Examples of said solvent include benzene, toluene, xylene, chlorobenzene, cyclohexanone, acetone, methyl ethyl ketone, diethyl ketone, tetrahydrofuran, ethyl acetate and dimethylformamide. The hydrogenation reaction temperature is 5° to 150° C., preferably 10° to 100° C. When said temperature is high, the high-molecular complex catalyst becomes deactivated or side reactions tend to occur; it is thus undesirous. For example, the solvent, the nitrile group or the styrene skeleton is hydrogenated at times.

The hydrogen pressure in the reaction is atmospheric pressure to 150 kg/cm$^2$, preferably atmospheric pressure to 100 kg/cm$^2$. A pressure of higher than 150 kg/cm$^2$ is also available, but practically unwanted because a cost of equipment goes high and handling becomes cumbersome.

It is possible that the catalyst used in the hydrogenation reaction can be removed from the reaction solution by adding an ion exchange resin to the reaction solution after reaction to adsorb the catalyst thereto, followed by centrifugal separation and filtration. When the other conjugated diene polymer than the nitrile group-containing polymer is hydrogenated, a high-molecular catalyst portion can be removed by extracting it with a solvent that dissolves the nitrile group-containing polymer but does not dissolve the hydrogenated polymer. Moreover, the catalyst may remain as such in the copolymer without removing it.

The hydrogenated polymer may be separated from the reaction solution by a usual method. Examples thereof are a steam coagulation method in which a polymer solution is directly contacted with steam, a direct drying method in which a polymer solution is dropped on a heating rotary drum to evaporate a solvent or the solvent in the polymer solution is evaporated under reduced pressure and a method in which a polymer solution is precipitated with the addition of a poor solvent. The hydrogenated polymer is thus separated from the reaction solution, subjected to hot air drying, vacuum drying or extrusion drying, and then recovered.

In this invention, the high-molecular complex formed from the palladium compound and the nitrile group-containing copolymer is used as a hydrogenation catalyst in the hydrogenation reaction of the conjugated diene polymer whereby the highly saturated polymer with only the carbon-carbon double bond of the conjugated diene polymer selectively highly hydrogenated can be obtained. The resulting hydrogenated polymer is excellent in weatherability, ozone resistance, heat resistance and cold resistance, and can be used in the wide-ranging field.

The following Examples and Comparative Examples illustrate this invention specifically. However, this invention is not limited thereto.

PREPARATION EXAMPLES OF CATALYSTS

An acrylonitrile-butadiene copolymer (hereinafter abbreviated as "NBR", $ML_{1+4}=50$) having an acrylonitrile content of 37% by weight was used as a nitrile group-containing copolymer.

As a palladium compound, the following compounds made by N. E. Chemcat Corporation were used.

| | |
|---|---|
| Palladium chloride | $PdCl_2$ |
| Palladium oxide | $PdO_2$ |
| Palladium hydroxide | $Pd(OH)_2$ |
| Palladium nitrate | $Pd(NO_3)_2$ |

Acetone was used as a solvent.

1) NBR was dissolved in acetone in a nitrogen atmosphere to form a 10 wt. % solution. Each of the palladium compounds was charged therein in an amount of 5 by weight based on NBR, and the mixture was stirred at room temperature under atmospheric pressure for a reaction time shown in Table 1. Because the palladium compound was insoluble or sparingly soluble in acetone, the insoluble content was dispersed in the colorless NBR solution at the initial stage of the reaction. However, as the reaction advanced and a high-molecular complex with palladium coordinated is formed, the solution came to show yellow or reddish yellow. After the reaction, the solution was filtered by means of a 0.2 micrometer membrane filter under nitrogen stream to separate the unreacted palladium compound. The filtrate was used as such in the hydrogenation reaction as a high-molecular complex catalyst solution, and the palladium compound left on the filter was reused as a starting material.

2) Formation of the high-molecular complex catalyst was ascertained by measuring UV absroption spectrum (near 265 to 275 nm) and visible absorption spectrum (wide zone near 360 nm) about a solution formed by dissolving the high-molecular complex evaporated to dryness in vacuo in dichloromethane under nitrogen stream. These absorptions were not shown in NBR alone or palladium(0).

3) The palladium content of the obtained high-molecular complex solution was measured by atomic-absorption spectrum, and the amount of the catalyst used in the hydrogenation reaction was determined. The palladium contents of the high-molecular complexes are shown in Table 1.

TABLE 1

| Catalyst No. | Starting palladium compound | Palladium content (ppm/NBR) | Reaction time (hrs.) |
| --- | --- | --- | --- |
| 1 | PdO (600 Mesh or less) | 497 | 20 |
| 2 | Pd(OH)$_2$ (600 Mesh or less) | 5500 | 1 |
| 3 | Pd(OH)$_2$ (600 Mesh or less) | 499 | 15 |
| 4 | PdCl$_2$ (commercial product) | 501 | 13 |
| 5 | PdCl$_2$ (commercial product) | 766 | 20 |
| 6 | Pd(NO$_3$)$_2$ (commercial product) | 1110 | 20 |

As shown in Catalyst Nos. 2 and 3, when the reaction time is prolonged, the palladium content is increased.

EXAMPLES 1 TO 3

Using each of the high-molecular complex catalyst solutions (Catalysts 1, 3 & 4), there was hydrogenated a carbon-carbon double bond of NBR (ML$_{1+4}$=50) wherein the acrylonitrile content was 37% by weight and Pd was not coordinated.

The palladium contents of these catalysts were 497 ppm, 499 ppm and 501 ppm respectively and thus approximately at the same level.

A 100-milliliter autoclave was charged with 50 g of each of the palladium complex catalyst solutions, and replaced with hydrogen thrice at a hydrogen pressure of 10 kg/cm$^2$. Then, the reaction was run at 50° C. for 6 hours under hydrogen pressure of 50 kg/cm$^2$. After the autoclave was cooled and depressurized, the content was added to a large amount of methanol, coagulated and dried. An iodine value of the resulting sample was measured according to JIS K-0070, and a hydrogenation ratio was found. The results are shown in Table 2.

COMPARATIVE EXAMPLES 1 TO 3

For comparison, PdO, Pd(OH) or PdCl$_2$ was used as such as a hydrogenation catalyst. A 100-milliliter autoclave was charged with 5 g of NBR and 45 g of acetone, and the inside of the system was purged with nitrogen. The palladium compound was charged therein in an amount of 500 ppm, calculated as palladium, based on the polymer. The hydrogenation reaction conditions were the same as in Examples 1 to 3. The results are shown in Table 2.

TABLE 2

|  | Catalyst | Hydrogenation ratio (%) |
| --- | --- | --- |
| Example 1 | No. 1 | 87.8 |
| Example 2 | No. 3 | 88.0 |
| Example 3 | No. 4 | 88.0 |
| Comparative Example 1 | PdO | 2.1 |
| Comparative Example 2 | Pd(OH)$_2$ | 7.9 |
| Comparative Example 3 | PdCl$_2$ | 5.3 |

From the data in Table 2, it becomes apparent that the complex comprising the palladium salt and the nitrile group-containing polymer is by far higher in activity as a hydrogenation catalyst than the palladium salt alone and that the starting palladium compounds show the same activity if palladium amounts are the same, regardless of their types.

EXAMPLES 4 TO 5

10 Using the high-molecular complex catalyst (Catalyst No. 5 or 6), NBR having the same composition as in Preparation Examples of Catalysts was hydrogenated. The palladium contents of these catalysts were 766 ppm and 1,110 ppm respectively. The amount of NBR was adjusted such that the palladium content of the system reached 50 ppm. The hydrogenation reaction was conducted under the same conditions as in Examples 1 to 3. The results are shown in Table 3.

From the data in Table 3, it follows that the high-molecular complex catalysts, though different in the palladium amount contained therein, show the same hydrogeneration activity if the palladium amounts in the reaction system are adjusted to the same.

EXAMPLES 6 TO 8

Using the same NBR as above, hydrogenation activity of the high-molecular complex catalyst (Catalyst No. 2, palladium content 5,500 ppm) was evaluated by measuring a hydrogenation ratio when the palladium content of NBR was changed. The results are shown in Table 4.

From the data in Table 4, it becomes apparent that as the amount of the high-molecular complex catalyst is larger, the hydrogenation ratio is increased under the same reaction conditions.

By the way, in Examples 1 to 8, the nitrile group of the acrylonitrile unit in NBR was not hydrogenated at all.

TABLE 3

|  | Example 4 | Example 5 |
| --- | --- | --- |
| Catalyst No. | 5 | 6 |
| High-molecular complex catalyst NBR weight ratio | 65.3/34.7 | 45.0/55.0 |
| Palladium content (ppm) | 500 | 500 |
| Hydrogenation ratio (%) | 88.1 | 88.2 |

TABLE 4

|  | Example 6 | Example 7 | Example 8 |
| --- | --- | --- | --- |
| High-molecular complex | 9.0/91.0 | 13.6/86.4 | 18.2/81.8 |

TABLE 4-continued

|  | Example 6 | Example 7 | Example 8 |
|---|---|---|---|
| catalyst NBR weight ratio |  |  |  |
| Palladium content (ppm) | 500 | 750 | 1000 |
| Hydrogenation ratio (%) | 88.1 | 93.5 | over 99 |

EXAMPLES 9 TO 10

Using the high-molecular complex catalyst (Catalyst No. 2), polybutadiene (hereinafter abbreviated as "BR") and a butadiene-styrene copolymer (hereinafter abbreviated as "SBR", a styrene content 25% by weight) were hydrogenated. The high-molecular complex catalyst (Catalyst No. 2) in the form of an acetone solution was dried by evaporating acetone under nitrogen stream and solved again in tetrahydrofuran. The same autoclave as in Example 1 was used. Under nitrogen atmosphere, 5 g of each of BR and SBR was dissolved in 45 g of tetrahydrofurane, and the high-molecular complex catalyst in the form of a tetrahydrofuran solution was added in an amount of 750 ppm, calculated as palladium, based on each of the polymers The hydrogenation reaction was run as in Example 1. After the reaction was over, the content was added to a large amount of cyclohexane to separate the hydrogenated polymer from the high-molecular complex catalyst, and said polymer was coagulated and dried. The iodine value of the obtained sample was measured in accordance with JIS K-0070, and a hydrogenation ratio was found. The results are shown in Table 5.

TABLE 5

|  | Example 9 | Example 10 |
|---|---|---|
| Hydrogenated polymer | BR | SBR |
| Catalyst No. 2/polymer weight ratio | 1/7.3 | 1/7.3 |
| Palladium content (ppm) | 750 | 750 |
| Hydrogenation ratio (%) | 89.2 | 91.6 |

Table 5 reveals that the high-molecular complex catalyst of this invention has ability to hydrogenate a carbon-carbon double bond of not only the nitrile group-containing polymer constituting said catalyst but also another non-compatible polymer having a different polarity. Besides it has such high selectivity that the benzene skeleton of the styrene unit in SBR is not hydrogenated.

What we claim is:

1. A method for hydrogenating a conjugated diene polymer employing a catalyst comprising a high molecular complex formed from a palladium compound and a nitrile group-containing polymer wherein said catalyst is used as a hydrogenation catalyst in the reaction of selectively hydrogenating only a carbon-carbon double bond of the conjugated diene polymer in solution.

2. The method of claim 1 wherein the conjugated diene-polymer contains at least one compound selected from butadiene and isoprene.

* * * * *